Figures 1, 2:
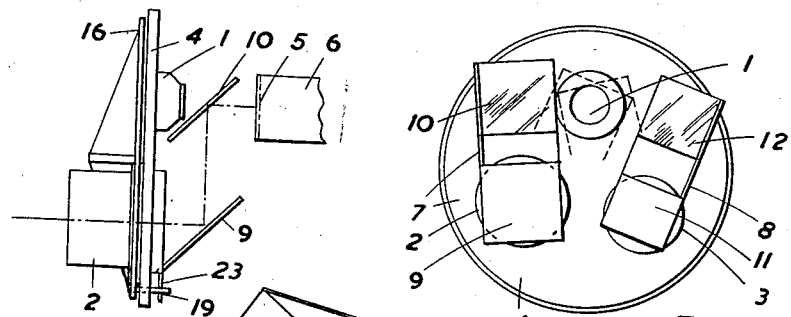

June 15, 1954  G. C. NEWTON  2,680,999
OPTICAL LENS MOUNTING
Filed May 9, 1950

Inventor
GEORGE CHARLES NEWTON
By Ralph E. Atherton
Attorney

Patented June 15, 1954

2,680,999

UNITED STATES PATENT OFFICE 2,680,999

OPTICAL LENS MOUNTING

George Charles Newton, Anerley, London, England, assignor to Electric & Musical Industries Limited, Hayes, Middlesex, England, a company of Great Britain Application May 9, 1950, Serial No. 160,891

Claims priority, application Great Britain May 10, 1949

3 Claims. (Cl. 95—45)

This invention relates to camera lens mountings for use in cameras, such as cinematograph or television cameras.

In such cameras it is sometimes desirable to employ a number of lenses of different focal lengths and heretofore these lenses have been carried by a mounting in the form of a rotatable turret. Frequently the turret includes a long focal length or telephoto lens and owing to the extent to which the long focal length lens projects from the turret difficulties arise in mounting the turret so as to enable it to be readily rotated to bring the various lenses into use.

The object of the present invention is to provide an improved camera lens mounting for a plurality of lenses in which one or other of the lenses can be brought into use without the necessity of moving the lens.

According to the invention, there is provided a camera lens mounting for a plurality of lenses, comprising a support, a first and second light reflecting surface mounted in fixed parallel relationship on said support, a plurality of lens mounting means, means movably mounting said support with the optical path between said two reflecting surfaces lying transversely of the axes of said lens mounting means, a first lens mounting means positioned to direct light directly towards an image plane and means for moving said support and reflecting surfaces to a position to obturate said first lens mounting means with the first light reflecting surface positioned to receive light from a second lens mounting means and the second light reflecting surface positioned to direct light reflected from said first reflecting surface on to said image plane.

In lens turrets employing different focal length lenses as heretofore proposed, owing to the different focal lengths of the lenses they project from the turret to different extents, and it is found that when the turret includes a long focal length or telephoto lens this lens may project from the turret to such an extent as to obscure the field of view of one or other of the other lenses. By employing a lens mounting in accordance with the invention, the optical path length required for a long focal length lens can be provided in the main by the light reflecting system whereby the lens can be arranged to project from the mounting by only a small distance compared with the extent to which it would project if carried by a turret as referred to above.

Figure 3:
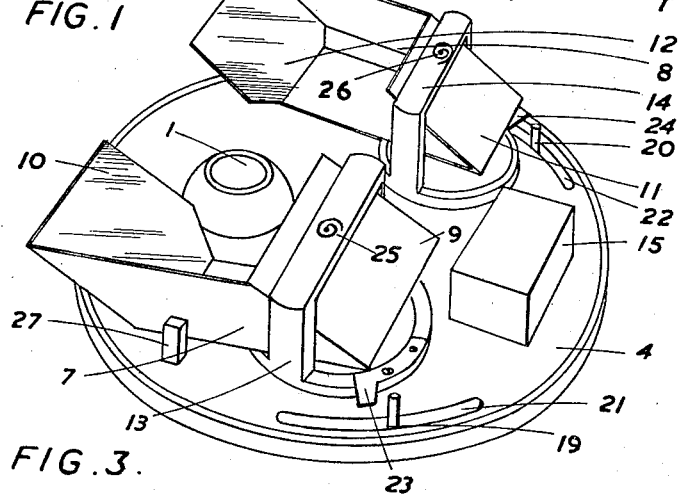
Figure 4:
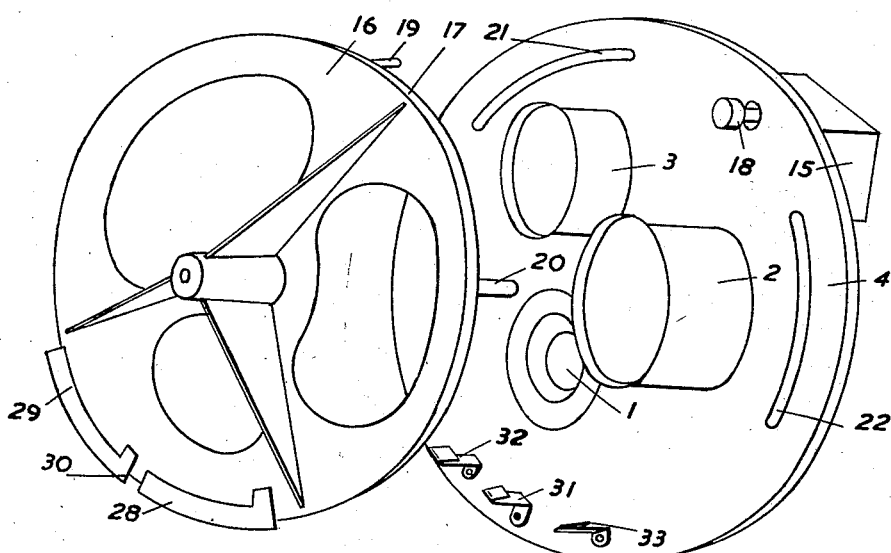

In order that the said invention may be clearly understood and readily carried into effect, the same will now be more fully described with reference to the accompanying drawings, in which:

Figure 1 illustrates diagrammatically a camera lens mounting in accordance with the invention, Figure 2 is a diagrammatic plan view of the arrangement shown in Figure 1, Figure 3 is a perspective view illustrating the manner of mounting the mirror systems shown in Figures 1 and 2, and Figure 4 is an exploded view illustrating mechanism for moving the mirror systems.

The mounting shown in the drawings is particularly suitable for use in a television camera. The lens mounting illustrated is designed to carry three lenses 1, 2 and 3 of different focal lengths providing magnifications say of 2:1, 1:1 and ½:1, the three lenses being arranged on a lens carrying disc 4. The short focal length lens 1 may be positioned so as to form an image directly on to the image plane or sensitive surface 5 of the television pick-up tube 6, whilst the other two lenses may be arranged to form images on said sensitive surface through the intermediary of mirror systems indicated generally by the reference numerals 7 and 8. Each mirror system includes a pair of mirrors 9, 10 and 11, 12 respectively, the mirrors 9 and 11 of each pair being disposed at an angle of about 45° with respect to the axis of the associated lenses 2 and 3 as shown in Figure 1, and the other mirrors 10 and 12 of said pairs being disposed facing the mirrors 9 and 11 respectively and arranged substantially parallel thereto and adapted to direct light on to the sensitive surface of the pick-up tube when either mirror system is moved to an operative position. The distance apart of the mirrors of each mirror system and the distance from the lens and from the sensitive surface of the pick-up tube are chosen to provide the appropriate path length for the light rays according to the focal length of each lens. Each mirror system is carried by a support, 13, 14 pivotally mounted about the axis of the respective lenses 2 and 3 and in order to bring one or other of the lenses 2 and 3 into operation the appropriate support is turned about its pivot. The mirror systems are so arranged, as shown in Figure 2, that when one or other of the mirror systems is moved from its inoperative position, shown in full lines in Figure 2, to its operative position shown in dotted lines, the mirror system obscures the short focal length lens 1. In this manner therefore although the short focal length lens 1 is normally disposed to direct light directly on to the sensitive surface of the pick-up tube, nevertheless, when one of the other lenses is in operation no light reaches the sensitive surface from the short focal length lens. Hence, any of the lenses can be brought into use without the necessity of rotating the three lenses simultaneously.

In order to cause pivotal movement of the supports 13 and 14 a reversible electric motor 15 is provided which is arranged to drive the periphery of an angularly movable control disc 16, said control disc being mounted for angular movement about the centre of the disc 4. The armature of the motor 15 is arranged to engage a peripheral flange 17 provided on said control disc through the medium of a rubber roller 18 on the end of the armature shaft. The control disc carries a pair of pins 19 and 20 which project through slots 21 and 22 in the disc 4 into positions to engage lugs 23 and 24 provided on each of the mirror supports 13 and 14. The mirror supports are biassed by suitable springs 25 and 26 so that the mirror systems are normally disposed out of the path of the short focal length lens 1, suitable stops of which one is shown at 27 being provided on the disc 4 to limit the movement of the mirror systems under the action of the springs 25 and 26. When it is desired to bring one or other of the longer focal length lenses 2 or 3 into use the circuit to the electric motor 15 is completed so that said control disc 16 is angularly moved causing one of the pins 19 or 20 to engage one of the lugs 23 or 24 moving one or other of the mirror systems according to the direction of rotation of the motor. The duration of operation of the motor, and hence the extent to which the disc 16 is angularly moved, is controlled by the provision of a pair of segmental contacts 28 and 29 provided on said control disc spaced apart by an insulating zone 30, said contacts 28 and 29 being connected by flexible conductors to the forward and reverse terminals of the motor 15 and co-operating with three fixed contacts 31, 32 and 33 carried by disc 4. The contacts 31, 32 and 33 are fed by a selector switch in series with a source of current and the common terminal of the reversible motor 15 in such a manner that when current is supplied to energise one of the fixed contacts 31, 32 or 33, touching one of the segmental contacts 28 or 29, the motor 15 is caused to revolve the control disc 16 in the direction appropriate to bring the insulated zone 30 opposite to said energised fixed contact when the circuit is broken and the motor stopped. Further manipulation of the selector switch would energise another contact causing rotation of the control disc 16 until that in turn is brought opposite the insulated zone 30 and it will be appreciated that the control disc 16 may be made to assume any of the three definite positions by suitably positioning and proportioning the segmental contacts 28, 29 in respect to the fixed contacts 31, 32 and 33. Thus, for example, the longer focal length lens 3 is brought into use by angular movement of the control disc 16 causing the pin 20 to engage the lug 24 turning the mirror support 8 about its axis against the action of the spring 26, meanwhile the mirror support 7 associated with lens 2 is maintained by its control spring 25 against the stop 27.

Although the invention is of particular use in conjunction with television cameras, it will be appreciated that it is equally applicable to cinematograph and other cameras.

What I claim is:

1. A camera lens mounting for a plurality of lenses, comprising a support, there being a first and second light reflecting surface in fixed parallel relationship on said support, a plurality of lens mounting means arranged to mount a plurality of lenses with their axes in parallel relationship, a first of said lens mounting means positioned to direct light directly towards an image plane, means pivotally mounting said support about the axis of a second lens mounting means with the optical path between said two light reflecting surfaces lying transversely of the axis of said second lens mounting means and of a length substantially equal to the distance between said axes and with the first of said light reflecting surfaces facing said latter means, and means for moving said support and reflecting surfaces to a position to obturate said first lens mounting means with the second light reflecting surface positioned to direct light reflected from said first reflecting surface on to said image plane, the angular disposition of said light reflecting surfaces being chosen to direct light on to said image plane along the axis of said obturated lens mounting means.

2. A camera lens mounting for three lenses, comprising a first support, there being first and second light reflecting surfaces in fixed parallel relationship on said support, a second support, there being third and fourth light reflecting surfaces in fixed parallel relationship on said second support, three lens mounting means arranged to mount a plurality of lenses with their axes in parellel relationship, a first of said lens mounting means being positioned to direct light directly towards an image plane, means pivotally mounting said first support about the axis of a second lens mounting means with the optical path between said first and second reflecting surfaces lying transversely of the axis of said second lens mounting means and of a length substantially equal to the distance between said axes and with the first of said light reflecting surfaces facing said latter means, means pivotally mounting said second support about the axis of a third lens mounting means with the optical path between said third and fourth light reflecting surfaces lying transversely of the axis of said third lens mounting means and with said last-mentioned optical path substantially equal to the distance between the axes of said first lens mounting means and said third lens mounting means with the third of said light reflecting surfaces facing said latter means, and means for selectively moving either of said supports and reflecting surfaces to a position to obturate said first lens mounting means with the second or fourth light reflecting surface positioned to direct light reflected from said first or third reflecting surface on to said image plane, the angular disposition of said light reflecting surfaces being chosen to direct light on to said image plane along the axis of said obturated lens mounting means.

3. A camera lens mounting for a plurality of lenses of different focal lengths, comprising a first support, there being first and second light reflecting surfaces in fixed parallel relationship on said support, a second support, there being third and fourth light reflecting surfaces in fixed parallel relationship on said second support, a plurality of lens mounting means arranged to mount a plurality of lenses of different focal lengths with their axes in parallel relationship, a first of said lens mounting means being positioned to direct light directly towards an image plane, means pivotally mounting said first support about the axis of a second lens mounting means with the optical path between said first and second light reflecting surfaces lying transversely of the axis of said second lens mounting means and of a length substantially equal to the distance between the axis of said first and second lens mounting means with the first of said light reflecting surfaces facing said latter means, means pivotally mounting said second support about the axis of a third lens mounting means with the optical path between said third and fourth light reflecting surfaces lying transversely of the axis of said third lens mounting means and with said last-mentioned optical path of a length substantially equal to the distance between the axes of said first and third lens mounting means with the third of said light reflecting surfaces facing said latter means, said optical paths being of lengths different from one another to suit the focal lengths of said lenses, and means for selectively moving either of said supports and reflecting surfaces to a position to obturate said first lens mounting means with the second or fourth light reflecting surface positioned to direct light reflected from said first or third reflecting surface on to said image plane, the angular disposition of said light reflecting surface being chosen to direct light on to said image plane along the axis of said obturated lens mounting means.

References Cited in the file of this patent

UNITED STATES PATENTS

| Number | Name | Date |
|---|---|---|
| 1,159,731 | Akeley | Nov. 9, 1915 |
| 1,423,697 | Szczepanik | July 25, 1922 |
| 1,631,303 | Washington | June 7, 1927 |
| 1,795,626 | Watkins | Mar. 10, 1931 |
| 2,149,217 | Heinisch et al. | Feb. 28, 1939 |
| 2,481,082 | Chew | Sept. 6, 1949 |
| 2,502,788 | Hunter | Apr. 4, 1950 |

FOREIGN PATENTS

| Number | Country | Date |
|---|---|---|
| 157,055 | Switzerland | Dec. 1, 1932 |

OTHER REFERENCES

Cone, Abstract of Serial No. 730,819, published March 7, 1950, 632 O. G. 302; now abandoned.